United States Patent
Yonetsu et al.

(10) Patent No.: US 7,713,641 B2
(45) Date of Patent: May 11, 2010

(54) MAGNETIC MATERIAL AND ANTENNA DEVICE

(75) Inventors: Maki Yonetsu, Mitaka (JP); Naoyuki Nakagawa, Kawasaki (JP); Seiichi Suenaga, Yokohama (JP); Tomohiro Suetsuna, Kawasaki (JP); Shinya Sakurada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/049,926

(22) Filed: Mar. 17, 2008

(65) Prior Publication Data

US 2008/0166592 A1    Jul. 10, 2008

Related U.S. Application Data

(63) Continuation of application No. PCT/JP2007/058457, filed on Apr. 18, 2007.

(30) Foreign Application Priority Data

Apr. 21, 2006  (JP)  ............... 2006-118170
Sep. 8, 2006   (JP)  ............... 2006-244778

(51) Int. Cl.
*G11B 5/66* (2006.01)
(52) U.S. Cl. .................................. 428/836.1
(58) Field of Classification Search ........ None
See application file for complete search history.

(56) References Cited

FOREIGN PATENT DOCUMENTS

| JP | 2003-197410 A | 7/2003 |
|----|---------------|--------|
| JP | 2003-317220 A | 11/2003 |
| JP | 2004-95937 A  | 3/2004 |
| JP | 2006-105864 A | 4/2006 |

OTHER PUBLICATIONS

English machine translation of JP 2003-317220, Nov. 2003.*
U.S. Appl. No. 12/174,016, filed Jun. 16, 2008, Eguchi, et al.

* cited by examiner

*Primary Examiner*—Holly Rickman
(74) *Attorney, Agent, or Firm*—Oblon, Spivak, McClelland, Maier & Neustadt, L.L.P.

(57) ABSTRACT

A magnetic material includes a substrate and a composite magnetic film formed on the substrate. The composite magnetic film comprises a plurality of columnar members formed on the substrate and having a longitudinal direction perpendicular to a surface of the substrate, each of the columnar members containing a magnetic metal or a magnetic alloy selected from at least one of Fe, Co, and Ni, and an inorganic insulator formed between the columnar members and selected from an oxide, a nitride, and fluoride of metal. The composite magnetic film has a minimum anisotropy magnetic field $Hk1$ in a surface parallel to the substrate surface and a maximum anisotropy magnetic field $Hk2$ in a surface parallel to the substrate surface, a ratio $Hk2/Hk1$ is greater than 1.

21 Claims, 5 Drawing Sheets

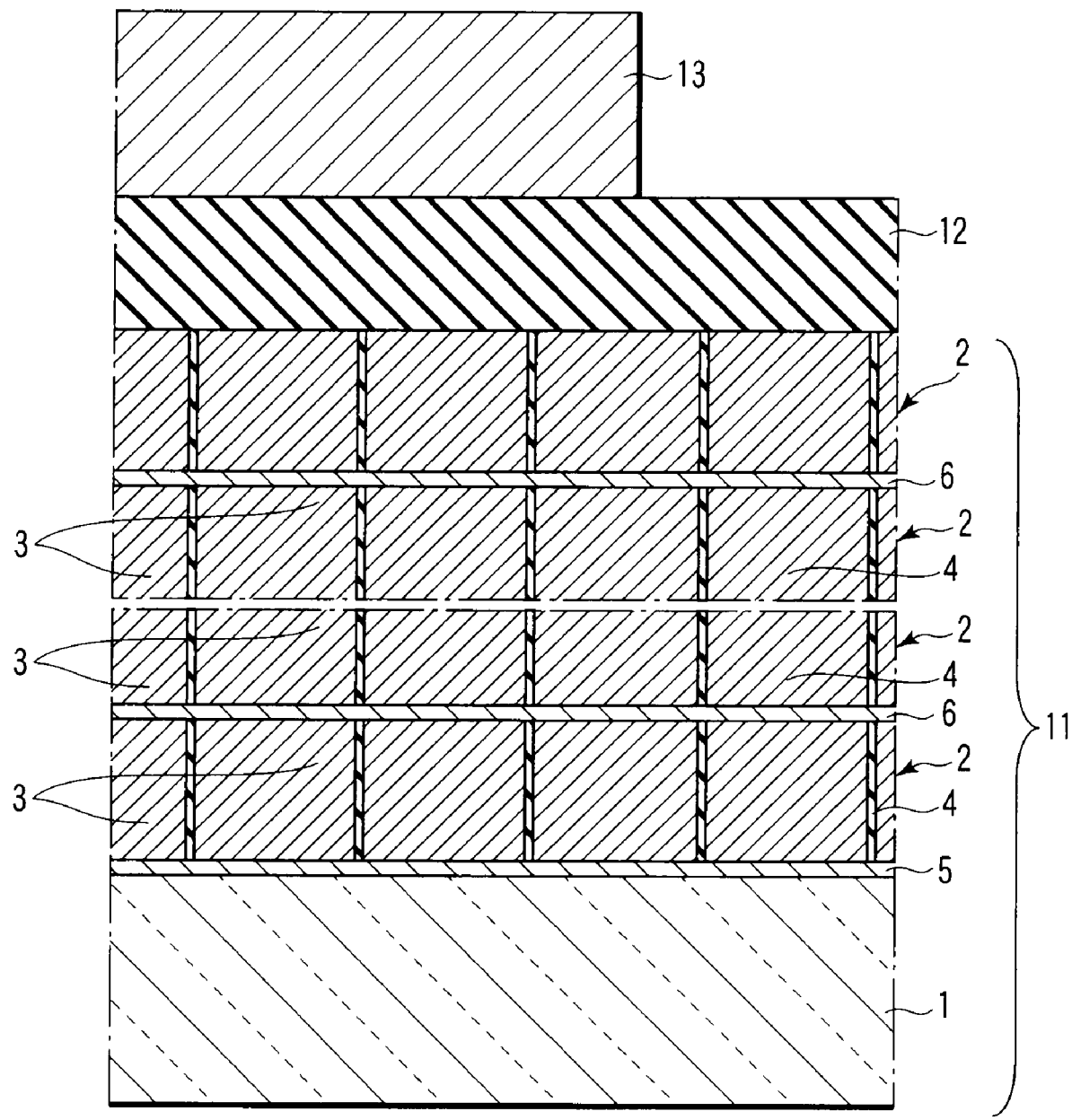
F I G. 6

MAGNETIC MATERIAL AND ANTENNA DEVICE

CROSS REFERENCE TO RELATED APPLICATIONS

This is a Continuation Application of PCT Application No. PCT/JP2007/058457, filed Apr. 18, 2007, which was published under PCT Article 21(2) in Japanese.

This application is based upon and claims the benefit of priority from prior Japanese Patent Applications No. 2006-118170, filed Apr. 21, 2006; and No. 2006-244778, filed Sep. 8, 2006, the entire contents of both of which are incorporated herein by reference.

BACKGROUND OF THE INVENTION

1. Field of the Invention

The present invention relates to a magnetic material and an antenna device.

2. Description of the Related Art

The frequency band of electric waves used for current mobile communication terminals is in a high-frequency region of at least 100 MHz. Thus, much attention has been paid to electronic parts and substrates which are useful in this high-frequency region. Mobile communications and satellite communications use electric waves of a high-frequency region of a GHz-band.

To cope with electric waves in such a high-frequency region, it is necessary to reduce energy loss and transmission loss in electronic parts. For example, with antenna devices essential for mobile communication terminals, electric waves generated by an antenna may suffer transmission loss during a transmission process. The transmission loss may be consumed in the electronic parts and a substrate as thermal energy to cause the electronic parts to generate heat. Further, the transmission loss cancels electric waves to be transmitted to an external device. Consequently, powerful electric waves need to be transmitted, thus preventing the effective use of power. Moreover, communications with electric waves at a minimized level have been desired.

High-frequency devices using an insulating substrate with a high magnetic permeability can catch generated electromagnetic waves in the substrate. This makes it possible to prevent electromagnetic waves from reaching electronic parts or a printed circuit board. That is, power can be saved.

Normal high-magnetic-permeability materials include metal or alloy composed of Fe or Co and oxides of Fe and Co. A high-magnetic-permeability material of metal or alloy suffers a significant transmission loss at an increased electric wave frequency owing to eddy currents. This makes it difficult to use such a material as a substrate. On the other hand, if a magnetic substance of an oxide typified by ferrite is used as a substrate, high resistance offered by the magnetic substance inhibits transmission loss. However, because of a resonant frequency of several hundred MHz, transmission loss caused by resonance becomes significant at high frequencies, making it difficult to appropriately use the device. Thus, a material for the substrate has been desired to be an insulating high-magnetic-permeability member which can also be used for electric waves of high frequencies and which suffers a minimized transmission loss.

As an attempt to produce such a high-magnetic-permeability member, high-magnetic-permeability nano-granular materials have been produced using a thin film technology such as sputtering. These materials have been confirmed to exhibit excellent properties even in a high-frequency region. However, with the granular structure, it is difficult to increase the volume percentage of magnetic particulates with high resistance maintained.

On the other hand, JP-A 2004-95937(KOKAI) discloses a composite magnetic material comprising an inorganic insulating base material composed of an oxide, a nitride, or a mixture of the oxide and the nitride, and a columnar structure with a single magnetic domain buried in the inorganic insulating base material and composed of a pure metal such as Fe, Co, or Ni or an alloy containing at least 20 wt % of the pure metal.

BRIEF SUMMARY OF THE INVENTION

A first aspect of the present invention provides a magnetic material comprising:

a substrate; and a composite magnetic film formed on the substrate and comprising a plurality of columnar members formed on the substrate and having a longitudinal direction perpendicular to a surface of the substrate, each of the columnar members containing a magnetic metal or a magnetic alloy selected from at least one of Fe, Co, and Ni, and an inorganic insulator formed between the columnar members and selected from an oxide, a nitride, and fluoride of metal, wherein the composite magnetic film has a minimum anisotropy magnetic field $Hk1$ in a surface parallel to the substrate surface and a maximum anisotropy magnetic field $Hk2$ in a surface parallel to the substrate surface, a ratio $Hk2/Hk1$ is greater than 1.

A second aspect of the present invention provides an antenna device comprising:

an antenna substrate containing the magnetic material; and an antenna located directly on a major surface of the antenna substrate or near the major surface.

BRIEF DESCRIPTION OF THE SEVERAL VIEWS OF THE DRAWING

FIG. 6 is a sectional view showing an antenna device according to the embodiment.

DETAILED DESCRIPTION OF THE INVENTION

A magnetic material according to an embodiment of the present invention will be described below in detail.

The magnetic material according to the embodiment comprises a substrate and a composite magnetic film formed on the substrate. The composite magnetic film comprises a plurality of columnar members formed on the substrate and having a longitudinal direction perpendicular to a surface of the substrate, each of the columnar members composed of a magnetic metal or a magnetic alloy selected from at least one of Fe, Co, and Ni, and an inorganic insulator formed on the substrate between the columnar members and selected from an oxide, a nitride, and fluoride of metal. The composite magnetic material has magnetic anisotropy in a direction (in-plane direction) parallel to the surface of the substrate.

Figure 1:
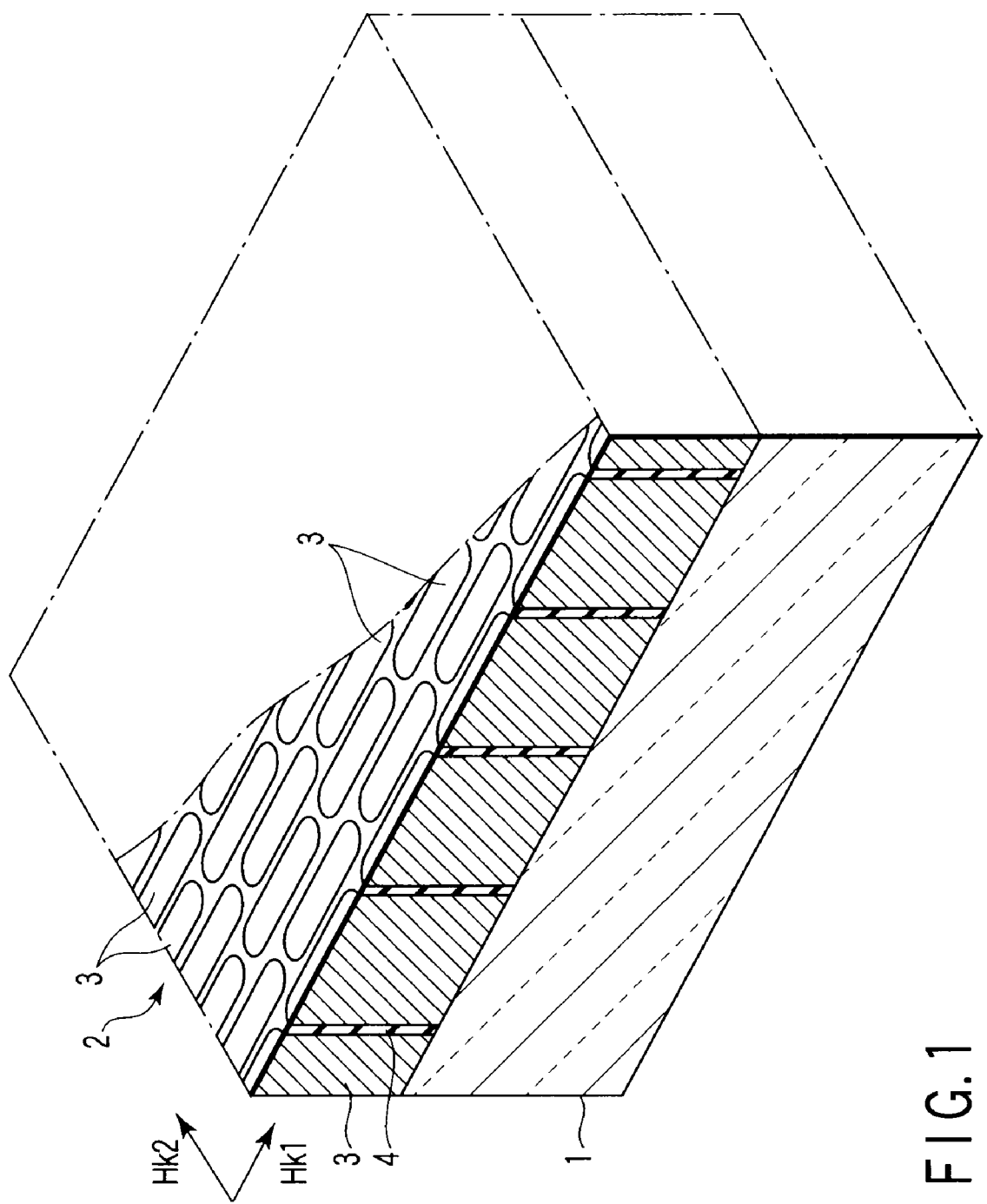
FIG. 1 is a partly cutaway perspective view of a magnetic material according to an embodiment.

The magnetic material according to the embodiment specifically has, for example, a structure shown in FIG. 1. The magnetic material comprises a substrate 1. A composite magnetic film 2 is formed on the substrate 1. The composite magnetic film 2 comprises a plurality of columnar members 3 formed on the substrate 1 and having a longitudinal direction perpendicular to the substrate 1 surface. Each of the columnar members 3 contains a magnetic metal or a magnetic alloy selected from at least one of Fe, Co, and Ni. By way of example, FIG. 1 shows elliptic cylinders each having an elliptic cross section perpendicular to a longitudinal direction of the columnar member 3. An inorganic insulator 4 selected from an oxide, a nitride, and a fluoride of metal is formed on the substrate 1 so as to locate between the columnar members 3. The composite magnetic film 2 has magnetic anisotropy in a surface parallel to the surface of the substrate 1.

The substrate is made of, for example, plastic such as polyimide or an inorganic material such as silicon oxide, alumina, MgO, Si, or glass.

A detailed description will be given of members constituting the magnetic material in accordance with the embodiment.

1. Configuration of the Columnar Member

The columnar member described in the embodiment may be, instead of the elliptic cylinder, a cylinder or a prism such as a square column, a hexagonal column, or an octagonal column.

The distance between the adjacent columnar members, that is, the thickness of the inorganic insulator between the columnar members, is preferably at least 1 nm and at most 3 nm. When the thickness of the inorganic insulator between the columnar members exceeds 3 nm, the composite magnetic film has an increased resistivity but the columnar members may have a reduced volume percentage (hereinafter simply referred to as Vf) and thus degraded magnetic properties.

The columnar member is made of, for example, a single crystal of a magnetic metal or a magnetic alloy, or an aggregate of magnetic metal grains or magnetic alloy grains. The columnar member is preferably a single crystal.

If the columnar member is composed of an aggregate of magnetic metal grains or magnetic alloy grains, the magnetic metal grains or magnetic alloy grains constituting the aggregate preferably have an average grain size of at least 1 nm and at most 50 nm. An average grain size of more than 50 nm may increase an eddy current loss in a high-frequency region, degrading the magnetic properties. An average grain size of more than 50 nm also makes it difficult to retain high-frequency magnetic properties. Specifically, with respect to a single magnetic domain structure and a multiple magnetic domain structure associated with the average grain size of the magnetic metal grains or magnetic alloy grains, the multiple magnetic domain structure is more stable than the single magnetic domain structure in terms of energy. Thus, the high-frequency property of the magnetic permeability of the multiple magnetic domain structure is inferior to that of the single magnetic domain structure. In the columnar member composed of an aggregate of magnetic metal grains or magnetic alloy grains, the grain size limit on the grains holding the single magnetic domain structure is at most about 50 nm. Consequently, the average grain size of the magnetic metal grains or magnetic alloy grains is preferably at most 50 nm.

All the columnar members preferably have a longitudinal direction perpendicular to the substrate surface. However, each columnar member may be partly inclined through ±30°, preferably ±10° to a perpendicular extending perpendicularly to the substrate. When the columnar member is composed of an aggregate of magnetic metal grains or magnetic alloy grains, the angle between the longitudinal direction of a group of grains formed of grains and the perpendicular that is perpendicular to the substrate surface is at most 30°, preferably at most 10°.

A material for the columnar members is at least one magnetic metal or magnetic alloy selected from the group consisting of Fe, Co, and Ni and selected according to the application. In particular, the columnar member is preferably made of an FeCo alloy. For example, to obtain a magnetic material with significant saturated magnetization, columnar members with Fe-30 atom % Co are used. To obtain a magnetic material with zero magnetization, columnar members with Fe-80 atom % Co are used. The magnetic alloy may contain an additional element such as B or N.

2. Configuration of the Insulator

The inorganic insulator preferably offers an insulating resistance of at least $1 \times 10^2$ $\Omega \cdot$cm.

Such an inorganic insulator contains at least one selected from the group consisting of an oxide, a nitride, a carbide, and a fluoride of metal selected from Mg, Al, Si, Ca, Cr, Ti, Zr, Ba, Sr, Zn, Mn, Hf, and rare earth elements (containing Y). In particular, the inorganic insulator is preferably made of silicon oxide.

The inorganic insulator preferably contains at most 30 atom % of magnetic metal element, one of Fe, Co, and Ni. A magnetic metal element amount of more than 30 atom % may reduce the electric resistivity of the inorganic insulator, degrading the magnetic properties of the entire composite magnetic film.

3. Anisotropy of the Composite Magnetic Film

The magnetic anisotropy of the composite magnetic film is typically obtained by a structure in which unit columnar members are intensively magnetically coupled together in a surface parallel to the substrate surface and a structure in which the unit columnar member structure exhibits shape anisotropy in the surface parallel to the substrate surface. The shape anisotropy involves, for example, the anisotropy of crystal orientations and of the columnar members.

Specific examples of magnetic anisotropy of the composite magnetic film will be listed in (1) to (4) below.

(1) The composite magnetic film has an anisotropic magnetic field $Hk1$ in a surface parallel to the substrate surface and an anisotropic magnetic field $Hk2$ parallel to the surface of the substrate and perpendicular to the anisotropic magnetic field $Hk1$, and has magnetic anisotropy such that the ratio ($Hk2/Hk1$) of the anisotropic magnetic fields is at least 1. The anisotropic magnetic fields $Hk1$ and $Hk2$ are shown in FIG. 1.

Here, Hk denotes, in a first quadrant (magnetization >0, applied magnetic field >0) observed when a magnetic field is applied to within the surface of the composite magnetic film, a magnetic field obtained at an intersecting point between a tangent obtained under a magnetic field with which magnetization varies most significantly in response to the applied magnetic field (the tangent obtained when magnetization is almost zero) and a tangent obtained under a magnetic field with which magnetization varies most insignificantly in response to the applied magnetic field (the tangent obtained when magnetization is completely saturated).

$Hk2$ is more preferably at least 40 Oe and at most 1 kOe. $Hk2/Hk1$ is more preferably at least 3 and at most 10. Defining such $Hk2$ and $Hk2/Hk1$ allows an appropriate magnetic anisotropy to be applied while increasing an effective magnetic permeability, enabling an increase in the frequency of the magnetic permeability.

With the arrangement of a plurality of columnar members, such magnetic anisotropy can be obtained by, for example, increasing the distance, in the film surface, between the columnar members in a direction corresponding to the anisotropic magnetic field Hk1, while reducing the distance between the columnar members in a direction corresponding to the anisotropic magnetic field Hk2.

The magnetic anisotropy can be obtained by varying the amount of magnetic element in the inorganic insulator. For example, the magnetic anisotropy can be obtained by setting the amount of magnetic element between the columnar members in the inorganic insulator larger in the direction corresponding to the anisotropic magnetic field Hk2 in the film surface of the composite magnetic film than in the direction corresponding to the anisotropic magnetic field Hk1.

The composite magnetic film is desired that the ratio $I_{(110)}/I_{total}$ of an intensity $I_{total}$ obtained by adding together all peak intensities attributed to diffraction crystal faces (110), (200), (211), (310), and (222) to a peak intensity $I_{(110)}$ attributed to the diffraction crystal surface (110) is at least 0.8, more preferably, at least 0.9. Where, the peak intensities are determined by XRD (X-ray diffraction pattern) of the surface of the composite magnetic film. That is, a crystal orientation perpendicular to the substrate is preferably oriented to a form direction {110}.

However, the columnar members in the composite magnetic film are geometrically and crystallographically isotropic in a surface parallel to the substrate surface.

(2) The composite magnetic film has a ratio $I_{(110)}/I_{total}$ of the intensity $I_{total}$ obtained by adding together all peak intensities attributed to the diffraction crystal faces (110), (200), (211), (310), and (222) to the peak intensity $I_{(110)}$ attributed to the diffraction crystal surface (110), where the peak intensities are determined by XRD of a surface of the composite magnetic film, which is perpendicular to the substrate surface, the ratio $I_{(110)}/I_{total}$ is at least 0.8. The composite magnetic film has columnar members each having a surface which is perpendicular to the substrate surface and which is oriented to a form plane {110}. The peak intensity ratio $I_{(110)}/I_{total}$ is more preferably at least 0.9.

The composite magnetic film comprises an aggregation area having a diameter of at least 1 μm, which is formed by aggregating a plurality of orientation areas each having a diameter of at most 100 nm. Each of the orientation areas has a plurality of columnar members each having a surface parallel to the substrate and a crystal face perpendicular to a minor axis of the columnar member which are oriented to the form plane {110}, respectively. In the aggregation area in which crystal faces are aligned with one another, crystal orientations are isotropically distributed.

Figure 2:
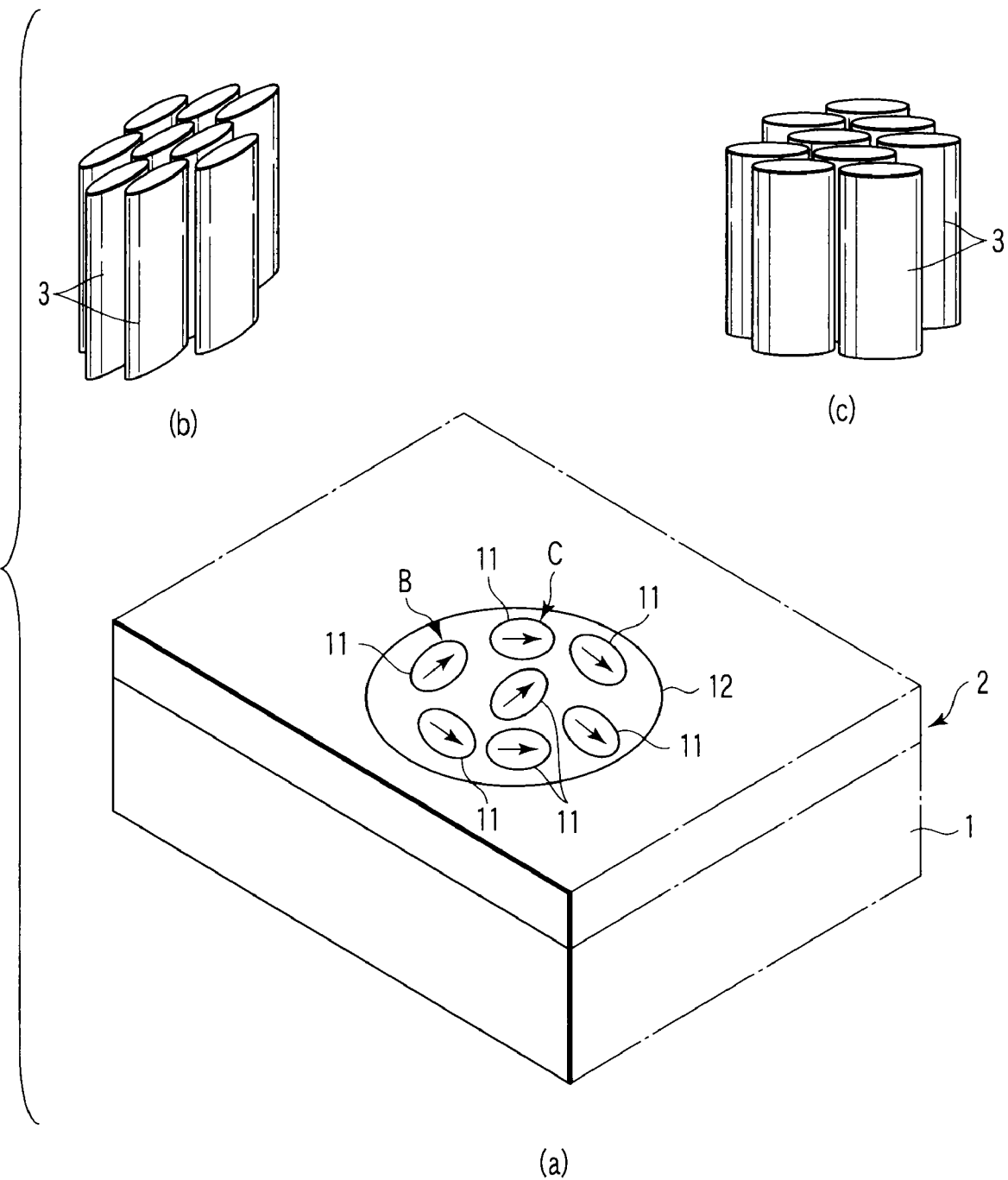
FIG. 2 is a schematic view showing face orientations in orientation areas and an aggregation area in a composite magnetic film in the magnetic material according to the embodiment.

This is specifically shown in FIG. 2. FIG. 2(a) is a schematic diagram showing a magnetic material. FIG. 2(b) is a schematic diagram showing the orientation of the columnar members in an orientation area shown by arrow B in FIG. 2(a). FIG. 2(c) is a schematic diagram showing the orientation of the columnar members in an orientation area shown by arrow C in FIG. 2(a). As shown in FIG. 2(a), the composite magnetic film 2 is formed on the substrate 1. The composite magnetic film 2 includes orientation areas 11 with a plurality of columnar members 3 each having a surface parallel to the substrate and a crystal face perpendicular to a minor axis of the columnar member, which are oriented to the form plane {110}, respectively. The orientation areas 11 are aggregated together to constitute an aggregation area 12. The aggregation area 12 is sized to have a diameter of at least 1 μm. The plurality of orientation areas 11 in the aggregation area 12 are each sized to have a diameter of at most 100 nm. As shown in FIGS. 2(b) and 2(c), the orientations in any of the orientation areas 11 in the aggregation area 12 in which crystal faces are aligned with one another are in different directions. Further, crystal orientations are isotropically distributed within the aggregation area 12. The orientation of the {110} face can be measured, for example, with an electron diffraction pattern.

The form of the composite magnetic film can be checked by allowing an electron beam to enter a sample film surface perpendicularly to the surface to measure an electron beam diffraction pattern within a visual field of diameter at most 100 nm, for example, 50 nm or 1 μm. In this case, with a visual field of diameter 50 nm, the luminance of a spot in the {110} form plane is defined to be an intensity, and the orientation may be such that the half value width of the intensity corresponds to an angle of ±15°, preferably ±10°. It is necessary that when any 6 to 10 points in a central portion of the film located at least 100 μm away from an edge are measured, a pattern with a half value width of at most ±15° is present in at least 50% of the measurement sites. In the same sample surface, an electron beam diffraction pattern of electron beam diameter 1 μm is shaped like a ring. The inside of the surface is crystallographically isotropic. In this case, the ring-shaped electron beam diffraction pattern may have an intensity distribution in the ring and has only to be continuous. The sample can appropriately maintain magnetic anisotropy in a surface parallel to the substrate.

(3) The composite magnetic film has a ratio $I_{(110)}/I_{total}$ of the intensity $I_{total}$ obtained by adding together all peak intensities attributed to the diffraction crystal faces (110), (200), (211), (310), and (222) to the peak intensity $I_{(110)}$ attributed to the diffraction crystal surface (110), where the peak intensities are determined by XRD of a surface of the composite magnetic film, which is perpendicular to the substrate surface, the ratio $I_{(110)}/I_{total}$ is at least 0.8. In addition, the composite magnetic film has columnar members each having a crystal face perpendicular to the substrate surface and oriented to a crystal plane {110}. The peak intensity ratio $I_{(110)}/I_{total}$ is more preferably at least 0.9.

Figure 3:
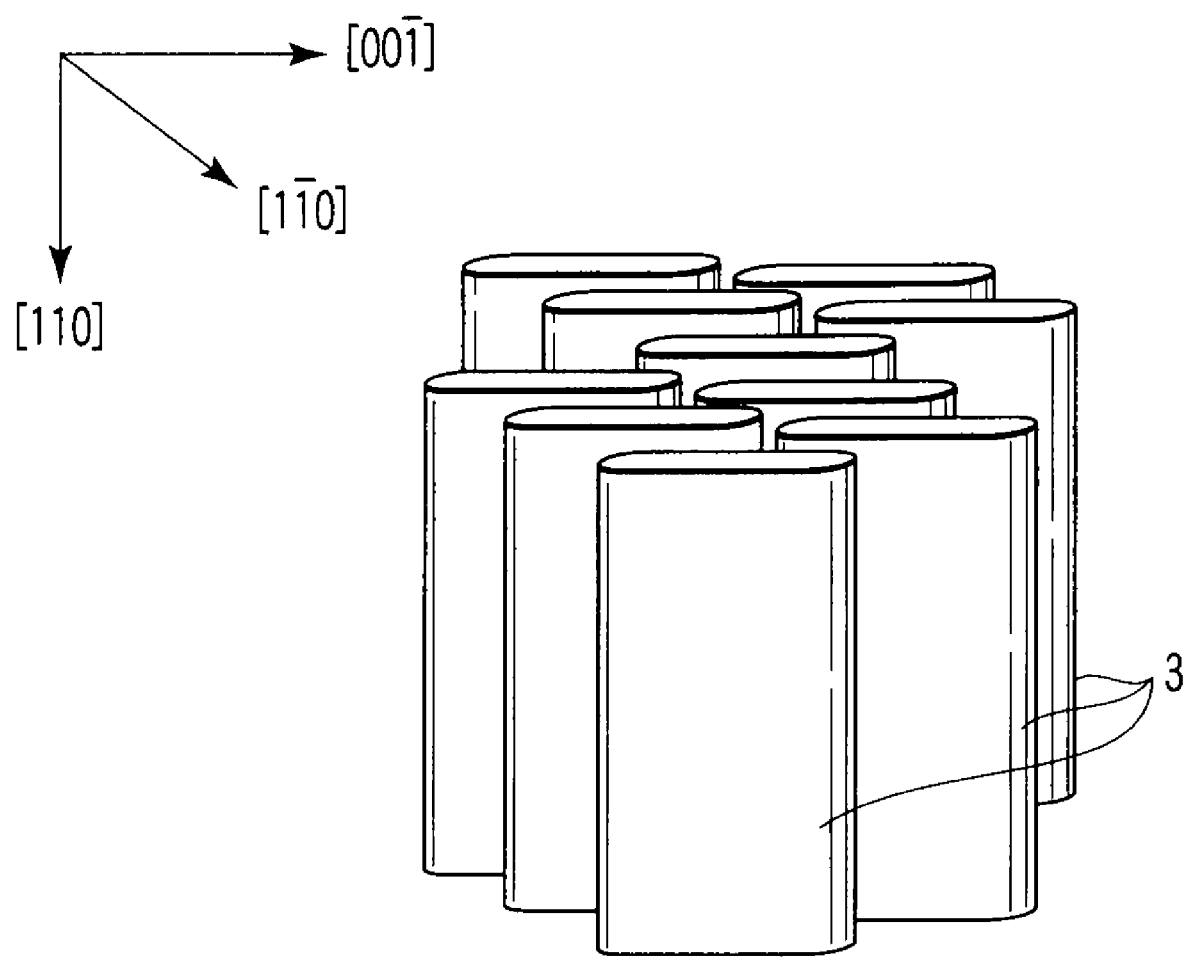
FIG. 3 is a sectional view showing further another magnetic material according to the embodiment.

More preferably, in the composite magnetic film, each of the columnar members has a major axis and a minor axis in a cross section perpendicular to the longitudinal direction of the columnar member, and a surface parallel to the substrate surface and a crystal face perpendicular to the minor axis in each of the columnar members are oriented to the form plane {110}. This is shown in FIG. 3. The orientation of the {110} face can be measured, for example, with an electron diffraction pattern.

The orientation of the composite magnetic film can be checked by allowing an electron beam to enter the sample film surface perpendicularly to the surface to measure an electron beam diffraction pattern within a visual field of diameter 1 μm. In this case, the luminance of a spot in the {110} form plane is defined to be an intensity, and the orientation may be such that the half value width of the intensity corresponds to an angle of at most ±15°, preferably at most ±10°. It is necessary that when any 6 to 10 points in the central portion of the film located at least 100 μm away from the edge are measured using an electron beam of diameter 1 μm, a pattern with a half value width of at most ±15° is present in at least 50% of the measurement sites. Within this range, magnetic anisotropy can be appropriately maintained in the surface parallel to the substrate.

(4) The composite magnetic film comprises columnar members containing an aggregate of grains of at least one magnetic metal or magnetic alloy selected from a group of Fe, Co, and Ni. Each of the columnar members has a cross section in a surface perpendicular to a longitudinal direction of the columnar member and which has an aspect ratio of at least 1.2. The columnar members having this aspect ratio account for at least 30% by volume in all the columnar members.

The columnar member having such an aspect ratio is, for example, an elliptic cylinder. The aspect ratio is the ratio of the longest axis (major axis) to the shortest axis (minor axis) orthogonal to the major axis, in a cross section perpendicular to the longitudinal direction of the elliptic cylinder.

The length of the minor axis is at most 50 nm, and the length of the major axis is not particularly limited but is preferably at least 60 nm and at most 1 μm.

If the columnar member is an aggregate of grains, the grain preferably has an aspect ratio of at least 5. The grains having this aspect ratio preferably account for at least 50% by volume in all the grains. Increasing the aspect ratio of the grain in a surface parallel to the substrate enables an increase in the filling factor of the magnetic grains. This in turn enables an increase in the saturation magnetization of the composite magnetic member per volume and per weight. Further, the grains can be provided with anisotropy on the basis of the shape, enabling an increase in the frequency of magnetic permeability.

In (1) to (4), the composite magnetic film having magnetic anisotropy in a surface parallel to the substrate surface preferably exhibits anisotropic of electric resistivity in the surface. Specifically, in the surface parallel to the substrate surface, the ratio (R1/R2) of the maximum resistivity (R1) to the minimum resistivity (R2) is at least 1.2, more preferably at least 2, most preferably at least 5.

In (1) to (4), the composite magnetic film desirably has a plurality of columnar members accounting for at least 70% by volume, more preferably at least 80% by volume in the composite magnetic film in order to improve the magnetic properties. However, when the plurality of columnar members account for an excessively high volume percentage in the composite magnetic film, the electric resistance may decrease to degrade the properties. Thus, the upper limit on the volume percentage of the columnar members in the composite magnetic film is preferably 95% by volume.

Moreover, in a composite magnetic film comprising columnar members formed on a substrate, having a longitudinal direction perpendicular to the surface of the substrate and containing a magnetic alloy composed of Fe and Co, and an inorganic insulator formed between the columnar members and composed of an oxide of silicon and oxygen, the composition molar ratio of the magnetic alloy to silicon is 90:10 to 95:5. Here, if the molar ratio of silicon to oxygen is exactly 1 to 2, volume ratio can be calculated by (molar ratio)×[(molecular weight)/(density)].

4. Thin Film Layer

Figure 4:
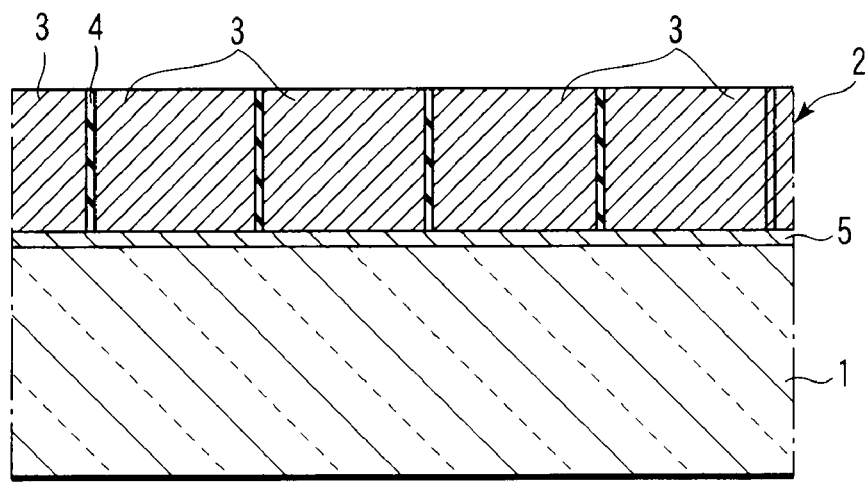
FIG. 4 is a sectional view showing another magnetic material according to the embodiment.

In the magnetic materials described above, a thin film layer containing a material different from those of the composite magnetic film may be formed at the interface between the substrate and the composite magnetic film, on the surface of the composite magnetic film, or both at the interface and on the surface of the composite magnetic film. Such a magnetic material comprises a thin film layer 5 interposed between the substrate 1 and the composite magnetic film 2, for example, as shown in FIG. 4.

Forming the composite magnetic film on the thin film layer makes it possible to control the organization of the columnar members and inorganic insulator in the composite magnetic film and to improve the magnetic properties of the resulting magnetic material. Here, the organization control of the columnar members and inorganic insulator in the composite magnetic film means the optimization of the organization of the columnar member such as the grain size of the columnar member, and the optimization of a crystal structure such as a crystal orientation. Optimizing the combination of the constituent elements of the composite magnetic film and the constituent elements of the thin film layer enables not only an increase in the degree of orientation of the columnar member but also the improvement of an inorganic insulating effect. Further, the magnetic anisotropy in the surface of the composite magnetic film can be enhanced.

Forming the thin film layer at the interface between the substrate and the composite magnetic film or on the surface of the composite magnetic film enables a reduction in the disturbance of the magnetic structure at the interface, providing a magnetic material with the magnetic properties further improved.

The thin film layer is preferably made of metal such as Ni, Fe, Cu, Ta, Cr, Co, Zr, Nb, Ru, Ti, Hf, W, Au, or an alloy of any of these metals, or an oxide such as alumina or silica.

The thin film layer desirably has a thickness of at most 50 nm, more preferably at most 10 nm. When the thin film layer has a thickness of more than 50 nm, the magnetization per volume may decrease to degrade the magnetic properties of the magnetic material.

5. Stack Structure of Composite Magnetic Films

Figure 5:
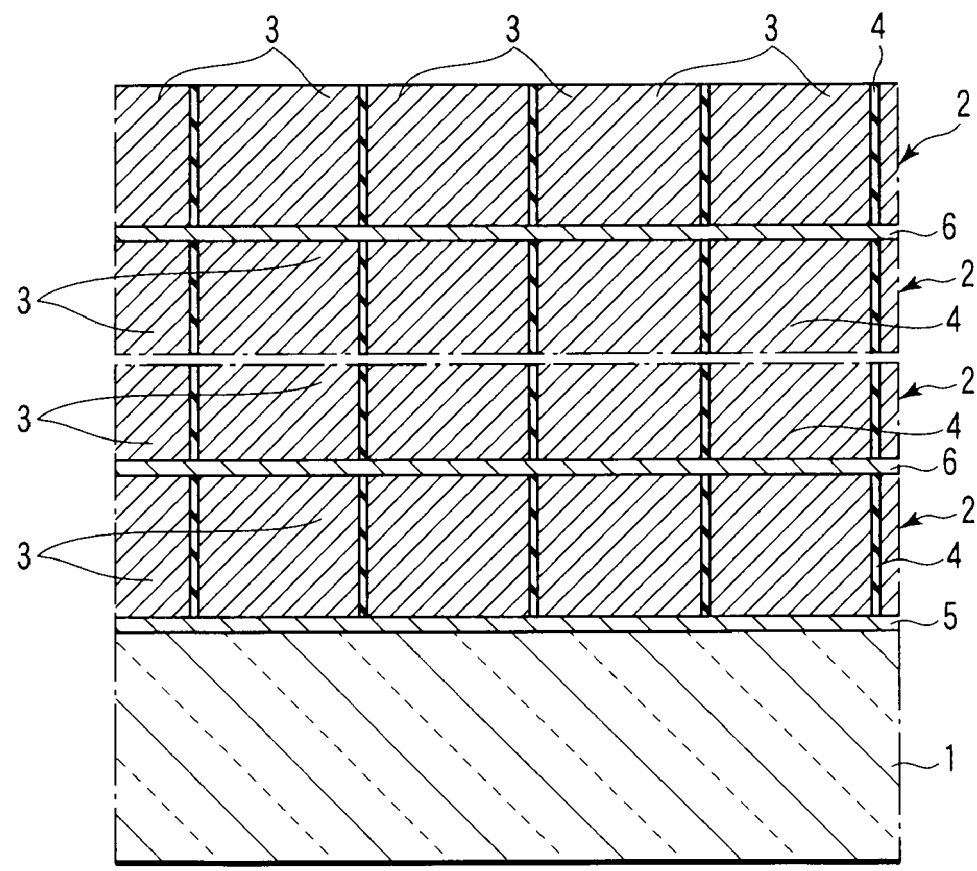
FIG. 5 is a sectional view showing further another magnetic material according to the embodiment.

The magnetic material in accordance with the present invention may have at least two composite magnetic films stacked on the substrate and an insulator layer interposed between the composite magnetic films. For example, as shown in FIG. 5, this magnetic material comprises at least two composite magnetic films 2 stacked on the substrate 1 and an insulator layer 6 formed between the composite magnetic films 2. Also in FIG. 5, the thin film layer 5 may be interposed at the interface between the substrate 1 and the composite magnetic film 2 as described above in order to reduce the adverse effect of demagnetizing fields.

As described above, the insulator layer is interposed between the at least two composite magnetic films, that is, the composite magnetic films are separated from each other in the thickness direction by the insulator layer in order to increase the film thickness. This makes it possible to reduce the adverse effect of demagnetizing fields that may be generated when the single composite magnetic film is made thicker without using the insulator layer, allowing the magnetic properties of the entire composite magnetic film to be improved. It is also possible to avoid the disturbance of the structure in the film thickness direction, which may occur when a desired step is executed to form a thicker composite magnetic film on the substrate.

The insulator layer is preferably made of at least one selected from a group of an oxide, a nitride, a carbide, and a fluoride of metal selected from, for example, Mg, Al, Si, Ca, Cr, Ti, Zr, Ba, Sr, Zn, Mn, Hf, and a rare earth element (containing Y). In particular, a material for the insulator layer is preferably selected to be similar to that for the inorganic insulator constituting the composite magnetic film.

The insulator layer preferably has a thickness of at most 1 μm, more preferably 500 nm, most preferably 100 nm. When the insulator layer has a thickness of more than 1 μm, the volume rate of the magnetic substance in the composite magnetic film may decrease to degrade the properties. To eliminate the magnetic coupling between the composite magnetic films, the insulator layer preferably has a lower limit thickness of 10 nm.

The magnetic material in accordance with the embodiment can be manufactured by forming the composite magnetic film on the substrate by sputtering, electron beam deposition, or the like. During the film formation, rotation of the substrate enables the composite magnetic film formed on the substrate to be effectively provided with the magnetic anisotropy in the surface parallel to the substrate surface.

6. Antenna Structure

An antenna device in accordance with the embodiment comprises an antenna substrate containing the above magnetic material and an antenna located on the antenna substrate. To be placed directly on the antenna substrate, the antenna is preferably located on the substrate side of the magnetic material. In the embodiment, a thick substrate may be polished to be thinner. To place the antenna near the major surface of the antenna substrate, an insulating member such as an armor insulating layer or a spacer is placed on the major surface of the antenna substrate, and the antenna is then placed on the major surface of the antenna substrate via the insulating member.

The antenna device will be specifically described with reference to FIG. 6. The antenna substrate 11 is composed of a magnetic material having the substrate 1, the at least two (preferably at least 5) composite magnetic films 2, and the insulator layer 6 provided between the composite magnetic films 2. The insulating layer 12 is formed on the uppermost composite magnetic film 2 on the antenna substrate 11. The insulating layer 12 can be made of, for example, a resin such as polystyrene, polyethylene, polyethyleneterephthalate (PET), or an epoxy resin, or ceramics such as $Al_2O_3$, MgO, or ZnO. The antenna 13 is formed on the insulating layer 12.

Examples of the present invention will be described below in detail.

EXAMPLES 1 to 5

An opposite magnetron sputter deposition apparatus was used. A target was composed of a magnetic metal containing at least one of Fe, Co, and Ni and at most 40% by volume of inorganic oxide of $SiO_2$ or $Al_2O_3$. A revolving holder was placed in a chamber so that a rectangular substrate passed over the target once per revolution. The substrate composed of materials shown in Table 1 was fixed on the holder in the chamber. The substrate was revolved at a speed of 5 rpm, while sputter grains from the target were deposited on the surface of the substrate in the chamber set in an Ar atmosphere and at a pressure of $5\times10^{-3}$ torr, to form a composite magnetic film having a thickness of 0.5 μm. Thus, four types of magnetic materials were manufactured. A deposition rate was at least 0.1 nm/min.

EXAMPLE 6

The opposite magnetron sputter deposition apparatus was used. The target was composed of a magnetic metal containing at least one of Fe, Co, and Ni and at most 40% by volume of inorganic oxide of $SiO_2$ or $Al_2O_3$. The revolving holder was placed in the chamber so that a rectangular substrate passed over the target once per revolution. A substrate composed of a material shown in Table 1 was fixed on the holder in the chamber. The substrate was revolved at a speed of 10 rpm, while sputter grains from the target were deposited on the surface of the substrate in the chamber set in an Ar atmosphere and at a pressure of $5\times10^{-3}$ torr, to form a composite magnetic film of thickness 0.5 μm. Thus, a magnetic material was manufactured. The deposition rate was at least 0.1 nm/min.

COMPARATIVE EXAMPLE 1

The opposite magnetron sputter deposition apparatus was used. The target was composed of a magnetic metal containing Fe or Co and at most 40% by volume of inorganic oxide of $Al_2O_3$. The revolving holder was placed in the chamber. A substrate composed of a material shown in Table 1 was fixed on the holder in the chamber. The rectangular substrate was revolved at a speed of at least 5 rpm, while sputter grains from the target were deposited on the surface of the substrate in the chamber set in an Ar atmosphere and at a pressure of $5\times10^{-3}$ torr, to form a composite magnetic film of thickness 0.5 μm. Thus, a magnetic material was manufactured. The deposition rate was at least 0.1 nm/min.

EXAMPLE 7

The opposite magnetron sputter deposition apparatus was used. The target was composed of a magnetic metal containing Fe or Co and at most 40% by volume of inorganic oxide of $Al_2O_3$. A rotatable holder was placed in the chamber, and the target was placed opposite the holder. A substrate composed of a material shown in Table 1 and obtained by forming a thin Cu layer of film thickness 0.01 μm was fixed on the holder in the chamber. The rectangular substrate was revolved at a speed of at least 5 rpm, while sputter grains from the target were deposited on the surface of the substrate in the chamber set in an Ar atmosphere and at a pressure of $5\times10^{-3}$ torr, to form a composite magnetic film of thickness 0.5 μm. The deposition rate was at least 0.1 nm/min. Subsequently, the composite magnetic film was subjected to a thermal treatment at 300° C. under a reduced pressure of $1\times10^{-6}$ torr to manufacture a magnetic material.

The magnetic materials obtained in Examples 1 to 7 and Comparative Example 1 were analyzed as follows.

1) Organization of the Composite Magnetic Films

The composite magnetic films in Examples 1 to 7 were observed by transmission electron microscope (TEM) and thus confirmed to have the following characteristics. A plurality of cylinders and elliptic cylinders of average diameter 3 to 10 nm were mixed together on the substrate so that the longitudinal direction of the cylinders was generally perpendicular to the substrate surface. An inorganic oxide was present between the columnar members located at a distance of about 1 to 3 nm.

In contrast, the composite magnetic film in Comparative Example 1 was confirmed by a TEM to have the following form. A plurality of cylinders and elliptic cylinders of average diameter 5 to 20 nm were mixed together on the substrate so that the longitudinal direction of the cylinders was generally perpendicular to the substrate surface. An inorganic oxide was present between the columnar members located at a distance of about 5 to 20 nm.

2) The composition of columnar members composed of a magnetic metal and the volume percentage of the inorganic insulator in the composite magnetic film were measured by using a scanning electron microscope (SEM-EDX) equipped with an analyzing electron microscope to analyze the element surface of a 10 μm×10 μm square part of the composite magnetic film in a film depth direction from the substrate surface. At this time, an acceleration voltage for an electron beam was 15 kV and the electron beam was transmitted through the film of thickness 0.5 μm down to the substrate. On the basis of the results of the analysis, the composition of the columnar members and the volume percentage of the inorganic insulator in the composite magnetic film were calculated.

3) Calculations were made of the ratio of the anisotropy magnetic field HK1 in a surface of the composite magnetic film parallel to the substrate surface to the anisotropy magnetic field Hk2 in the same surface which is perpendicular to Hk1 as well as the magnetic field intensity of Hk2. To achieve the calculations, a vibrating sample magnetometer (VSM) was used to measure the anisotropy magnetic fields Hk1 and Hk2 on the two orthogonal axes in the square surface of the composite magnetic film. Further, the magnetic intensity (Oe) of the larger anisotropy magnetic field Hk2 was measured.

4) Ratio of Resistivities in the Surface of the Composite Magnetic Film Parallel to the Substrate Surface The ratio R1/R2 was calculated by using a four terminal method to measure the maximum resistivity (R1) and the minimum resistivity (R2) on the two orthogonal axes in the square surface (surface parallel to the substrate surface) of the composite magnetic film.

5) Degree of Orientation of the Columnar Members

An X-ray diffraction method was used to calculate the ratio $I_{(110)}/I_{total}$ of all the diffraction peak intensities $I_{total}$ of the composite magnetic film surface to the diffraction peak intensity $I(110)$ of the crystal orientation (110) of the surface 7) Magnetic Permeability Real Part ($\mu'$) of the Composite Magnetic Film at 1 GHz and the Ratio ($\mu'/\mu''$) of the Magnetic Permeability Real Part to the Magnetic Permeability Imaginary Part ($\mu''$)

$\mu'$ and $\mu''$ were measured by using a Ultra-High-Frequency Magnetic Permeability Measuring Apparatus PMM-9G1 manufactured by Ryowa Electronics Co., Ltd. to excite the magnetic materials in the direction of in-plane hard axis within the range from 1 MHz to 9 GHz. Specifically, measurements were made by exciting the magnetic materials in the direction of in-plane hard axis with a 2-kOe direct-current magnetic field applied in the direction of sample easy axis (this corresponds to background measurement) and with the application of the magnetic current omitted. Magnetic permeability was evaluated on the basis of excitation voltages and impedance measurements in both cases.

Table 1 shows the evaluations of items 2) to 6) for Examples 1 to 7 and Comparative Example 1.

TABLE 1

| | Substrate | Metal composition (atom %) | Type and volume percentage of inorganic insulator (vol %) | Ratio of anisotropy magnetic fields (Hk2/Hk1) | Magnetic field intensity of Hk2 (Oe) | Ratio of resistivities (R2/R1) |
|---|---|---|---|---|---|---|
| Example 1 | Slide glass | Fe—30% Co | SiO$_2$ 30% | 10 | 150 | 1.5 |
| Example 2 | Polyimide film | Fe—30% Co | SiO$_2$ 35% | 4 | 90 | 1.4 |
| Example 3 | Slide glass | Fe—80% Co | SiO$_2$ 30% | 3 | 100 | 1.2 |
| Example 4 | Slide glass | Fe—80% Ni | Al$_2$O$_3$ 35% | 10 | 100 | 1.2 |
| Example 5 | Slide glass | Fe—30% Co | SiO$_2$ 20% | 16 | 160 | 1.8 |
| Example 6 | Slide glass | Fe—30% Co | SiO$_2$ 30% | 12 | 160 | 1.6 |
| Comparative Example 1 | Slide glass | Fe—30% Co | Al$_2$O$_3$ 50% | 1 | 300 | 1 |
| Example 7 | Slide glass | Fe—80% Co | Al$_2$O$_3$ 35% | 3.5 | 125 | 1.4 |

| | Degree of orientation *1 of columnar member | Degree of in-plane orientation *2 of columnar member (%) | Magnetic permeability real part ($\mu'$) | Ratio *3 of magnetic permeability real part to magnetic permeability imaginary part |
|---|---|---|---|---|
| Example 1 | 0.99 | 50 | 150 | >10 |
| Example 2 | 0.90 | 30 | 150 | >10 |
| Example 3 | 0.85 | 40 | 130 | >20 |
| Example 4 | 0.90 | 40 | 60 | >20 |
| Example 5 | 0.99 | 60 | 200 | >6 |
| Example 6 | 0.99 | 60 | 160 | >8 |
| Comparative Example 1 | 0.83 | 30 | 90 | <10 |
| Example 7 | 0.90 | 40 | 120 | >20 |

*1 is expressed by $I_{(110)}/I_{total}$.
*2 is the rate of those of any measurement points at which a pattern with a half value width of at most ±15° is present.
*3 is expressed by $\mu'/\mu''$ ($\mu'$: magnetic permeability real part, $\mu''$: magnetic permeability imaginary part).

6) Degree of In-Plane Orientation of the Columnar Members

Measurements were made by an electron beam diffraction method with the transmission electron microscope. An electron beam for measurements had a beam diameter of 50 nm. Any 6 to 10 points in a central portion of the film located at least 100 μm from an edge were measured to calculate the rate at which a pattern with a half value width of at most +15° was present in at least 50% of the measurement sites.

As is apparent from Table 1, the composite magnetic films constituting the magnetic materials in Examples 1 to 7 exhibit better performance than that in Comparative Example 1 in terms of the volume percentage (Vf) of the magnetic metal and the ratio ($\mu'/\mu''$) of the magnetic permeability real part to the magnetic permeability imaginary part at 1 GHz, and also has excellent magnetic properties.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic material comprising:
   a substrate; and
   a composite magnetic film formed on the substrate and comprising a plurality of columnar members formed on the substrate and having a longitudinal direction perpendicular to a surface of the substrate, each of the columnar members containing a magnetic metal or a magnetic alloy selected from at least one of Fe, Co, and Ni, and at least one inorganic insulator formed between the columnar members and selected from an oxide, a nitride, and fluoride of metal,
   wherein the composite magnetic film has a minimum anisotropy magnetic field Hk1 in a surface parallel to the substrate surface and a maximum anisotropy magnetic field Hk2 in a surface parallel to the substrate surface, a ratio Hk2/Hk1 is greater than 1, and
   the composite magnetic film has crystal orientations isotropically distributed in the surface parallel to the substrate surface.

2. The magnetic material according to claim 1, wherein the magnetic metal or magnetic alloy is Fe or an Fe alloy having a bcc structure, and the composite magnetic film has a ratio $I_{(110)}/I_{total}$ of an intensity $I_{total}$ obtained by adding together all peak intensities attributed to diffraction crystal faces (110), (200), (211), (310), and (222) to a peak intensity $I_{(110)}$ attributed to the diffraction crystal surface (110), where the peak intensities are determined by XRD of the surface, the ratio $I_{(110)}/I_{total}$ is at least 0.8.

3. The magnetic material according to claim 1, wherein each of the columnar members has a major axis and a minor axis in a cross section perpendicular to a longitudinal direction of the columnar member, and a surface parallel to the substrate surface and a crystal face perpendicular to the minor axis in each of the columnar members are oriented to a form plane {110} face.

4. The magnetic material according to claim 1, wherein the columnar members each having an aspect ratio of at least 1.2 in a cross section perpendicular to the longitudinal direction of the columnar members account for at least 30% by volume in all the columnar members.

5. The magnetic material according to claim 1, wherein the composite magnetic film exhibits anisotropy of an electric resistivity in the surface parallel to the substrate surface, and a ratio R2/R1 of a maximum resistivity R1 to a minimum resistivity R2 is at least 1.2.

6. The magnetic material according to claim 1, wherein the plurality of columnar members account for at least 70 vol % in the composite magnetic film.

7. The magnetic material according to claim 1, wherein further comprising at least two layers of the composite magnetic film formed on the substrate, a thin film layer formed between the substrate and a first layer of the composite magnetic film, containing metal selected from Ni, Fe, Cu, Ta, Cr, Co, Zr, Ru, Ti, Hf, W, and Au, alloy containing the metal, aluminum oxide, or silicon oxide, and an insulator layer formed between the composite magnetic films.

8. A magnetic material comprising:
   a substrate; and
   a composite magnetic film formed on the substrate and comprising a plurality of columnar members formed on the substrate and having a longitudinal direction perpendicular to a surface of the substrate, each of the columnar members containing a magnetic metal or a magnetic alloy selected from at least one of Fe, Co, and Ni, and at least one inorganic insulator formed between the columnar members and selected from an oxide, a nitride, and fluoride of metal,
   wherein the composite magnetic film has a minimum anisotropy magnetic field Hk1 in a surface parallel to the substrate surface and a maximum anisotropy magnetic field Hk2 in a surface parallel to the substrate surface, the Hk2 is at least 40 Oe and a ratio Hk2/Hk1 is at least 3 and
   the composite magnetic film has crystal orientations isotropically distributed in the surface parallel to the substrate surface.

9. The magnetic material according to claim 8, wherein the magnetic metal or magnetic alloy is Fe or an Fe alloy having a bcc structure, and the composite magnetic film has a ratio $I_{(110)}/I_{total}$ of an intensity $I_{total}$ obtained by adding together all peak intensities attributed to diffraction crystal faces (110), (200), (211), (310), and (222) to a peak intensity $I_{(110)}$ attributed to the diffraction crystal surface (110), where the peak intensities are determined by XRD of a surface of the composite magnetic film, the ratio $I_{(110)}/I_{total}$ is at least 0.8.

10. The magnetic material according to claim 8, wherein each of the columnar members has a major axis and a minor axis in a cross section perpendicular to a longitudinal direction of the columnar member, and a surface parallel to the substrate surface and a crystal face perpendicular to the minor axis in each of the columnar members are oriented to a form plane {110} face.

11. The magnetic material according to claim 8, wherein the columnar members having an aspect ratio of at least 1.2 in a cross section perpendicular to the longitudinal direction of the columnar members account for at least 30% by volume in all the columnar members.

12. The magnetic material according to claim 8, wherein the composite magnetic film exhibits anisotropy of electric resistivity in the surface parallel to the substrate surface, and a ratio R2/R1 of a maximum resistivity R1 to a minimum resistivity R2 is at least 1.2.

13. The magnetic material according to claim 8, wherein the plurality of columnar members account for at least 70% by volume in the composite magnetic film.

14. The magnetic material according to claim 8, wherein further comprising at least two layers of the composite magnetic film formed on the substrate, a thin film layer formed between the substrate and a first layer of the composite magnetic film, containing metal selected from Ni, Fe, Cu, Ta, Cr, Co, Zr, Ru, Ti, Hf, W, and Au, alloy containing the metal, aluminum oxide, or silicon oxide, and an insulator layer formed between the composite magnetic films.

15. An antenna device comprising:
    an antenna substrate containing the magnetic material according to claim 1; and
    an antenna located near a major surface of the antenna substrate.

16. A magnetic material comprising:
    a substrate; and
    a composite magnetic film formed on the substrate and comprising a plurality of columnar members formed on the substrate and having a longitudinal direction perpendicular to a surface of the substrate, each of the columnar members containing a magnetic metal or a magnetic alloy selected from at least one of Fe, Co, and Ni, and at least one inorganic insulator formed between the columnar members and selected from an oxide, a nitride, and fluoride of metal, wherein the composite magnetic film has a minimum anisotropy magnetic field Hk1 in a surface parallel to the substrate surface and a maximum anisotropy magnetic field Hk2 in a surface parallel to the substrate surface, a ratio Hk2/Hk1 is greater than 1, and the composite magnetic film has a crystal face in the surface parallel to the substrate surface and the crystal face being oriented to a form plane {110} face.

17. The magnetic material according to claim 16, wherein the magnetic metal or magnetic alloy is Fe or an Fe alloy having a bcc structure, and the composite magnetic film has a ratio $I_{(110)}/I_{total}$ of an intensity $I_{total}$ obtained by adding together all peak intensities attributed to diffraction crystal faces (110), (200), (211), (310), and (222) to a peak intensity $I_{(110)}$ attributed to the diffraction crystal surface (110), where the peak intensities are determined by XRD of the surface, the ratio $I_{(110)}/I_{total}$ is at least 0.8.

18. The magnetic material according to claim 16, wherein each of the columnar members has a major axis and a minor axis in a cross section perpendicular to a longitudinal direction of the columnar member, and a surface parallel to the substrate surface and a crystal face perpendicular to the minor axis in each of the columnar members are oriented to a form plane {110} face.

19. A magnetic material comprising:
a substrate; and
a composite magnetic film formed on the substrate and comprising a plurality of columnar members formed on the substrate and having a longitudinal direction perpendicular to a surface of the substrate, each of the columnar members containing a magnetic metal or a magnetic alloy selected from at least one of Fe, Co, and Ni, and at least one inorganic insulator formed between the columnar members and selected from an oxide, a nitride, and fluoride of metal, wherein the composite magnetic film has a minimum anisotropy magnetic field Hk1 in a surface parallel to the substrate surface and a maximum anisotropy magnetic field Hk2 in a surface parallel to the substrate surface, the Hk2 is at least 40 Oe and a ratio Hk2/Hk1 is at least 3, and the composite magnetic film has a crystal face in the surface parallel to the substrate surface and the crystal face being oriented to a form plane {110} face.

20. The magnetic material according to claim 19, wherein the magnetic metal or magnetic alloy is Fe or an Fe alloy having a bcc structure, and the composite magnetic film has a ratio $I_{(110)}/I_{total}$ of an intensity $I_{total}$ obtained by adding together all peak intensities attributed to diffraction crystal faces (110), (200), (211), (310), and (222) to a peak intensity $I_{(110)}$ attributed to the diffraction crystal surface (110), where the peak intensities are determined by XRD of a surface of the composite magnetic film, the ratio $I_{(110)}/I_{total}$ is at least 0.8.

21. The magnetic material according to claim 19, wherein each of the columnar members has a major axis and a minor axis in a cross section perpendicular to a longitudinal direction of the columnar member, and a surface parallel to the substrate surface and a crystal face perpendicular to the minor axis in each of the columnar members are oriented to a form plane {110} face.

* * * * *